US010114410B2

(12) United States Patent
Ke et al.

(10) Patent No.: US 10,114,410 B2
(45) Date of Patent: Oct. 30, 2018

(54) COVER

(71) Applicant: ASUSTeK COMPUTER INC., Taipei (TW)

(72) Inventors: Chih-Teng Ke, Taipei (TW); Chung-Jen Chung, Taipei (TW); Sheng-Chieh Huang, Taipei (TW); Iven Benjamin Dieterle, Taipei (TW); Ying-Jing Chen, Taipei (TW); Hui-Chuan Ma, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/489,995

(22) Filed: Apr. 18, 2017

(65) Prior Publication Data
US 2017/0322593 A1 Nov. 9, 2017

Related U.S. Application Data

(60) Provisional application No. 62/330,868, filed on May 3, 2016.

(30) Foreign Application Priority Data

Jan. 3, 2017 (TW) .............................. 106100091 A

(51) Int. Cl.
*G06F 1/16* (2006.01)
(52) U.S. Cl.
CPC .......... *G06F 1/1618* (2013.01); *G06F 1/1626* (2013.01); *G06F 1/1681* (2013.01); *G06F 2200/1634* (2013.01)

(58) Field of Classification Search
CPC .... G06F 1/1616; G06F 1/1637; G06F 1/1618; G06F 1/1681; G06F 1/1654; H05K 1/181; H05K 5/04
See application file for complete search history.

(56) References Cited

U.S. PATENT DOCUMENTS

| 8,472,168 | B2 | 6/2013 | Su |
| 9,000,871 | B2 | 4/2015 | Cencioni |
| 2012/0194448 | A1 | 8/2012 | Rothkopf |
| 2012/0211377 | A1* | 8/2012 | Sajid .................... G06F 1/1628 206/216 |
| 2013/0140203 | A1 | 6/2013 | Chiang et al. |
| 2013/0328917 | A1 | 12/2013 | Zambetti et al. |

FOREIGN PATENT DOCUMENTS

| CN | 202058075 U | 11/2011 |
| CN | 202453769   | 9/2012  |
| CN | 202563393 U | 11/2012 |

(Continued)

OTHER PUBLICATIONS

Office Action issued in corresponding Taiwan patent application dated Jul. 13, 2017.

*Primary Examiner* — Dimary Lopez Cruz
*Assistant Examiner* — Ingrid Wright
(74) *Attorney, Agent, or Firm* — McClure, Qualey & Rodack, LLP

(57) ABSTRACT

A cover includes a first plate, a second plate, an input device, a connecting base and a plurality of fixing components. The cover can change between a plurality of states. The states of the cover are kept via the fixing components.

15 Claims, 22 Drawing Sheets

(56) References Cited

FOREIGN PATENT DOCUMENTS

| | | |
|---|---|---|
| CN | 103162075 B | 5/2015 |
| CN | 104765417 | 7/2015 |
| CN | 204462975 U | 7/2015 |
| CN | 105224021 A | 1/2016 |
| TW | 201145965 | 12/2011 |
| TW | M479643 | 6/2014 |
| TW | M482773 | 7/2014 |
| TW | M493207 | 1/2015 |

* cited by examiner

COVER

CROSS-REFERENCE TO RELATED APPLICATION

This application claims the priority benefit of U.S. provisional application Ser. No. 62/330,868, filed on May 3, 2016 and TW application serial No. 106100091, filed on Jan. 3, 2017. The entirety of the above-mentioned patent applications are hereby incorporated by references herein and made a part of specification.

BACKGROUND OF THE INVENTION

Field of the Invention

The disclosure relates to a cover and, more specifically, to a cover for an electronic device.

Description of the Related Art

Nowadays, portable device becomes popular. Kinds of protection means are developed for the portable device, such as a cover. Moreover, peripheral electronic devices, such as a keyboard, usually cooperate with the portable device to expand functions. More and more simple, intuitive and multifunctional accessories are developed for portable devices.

BRIEF SUMMARY OF THE INVENTION

According to one aspect of the disclosure, a cover adapted to an electronic device comprises a first plate, a second plate, an input device, a connecting base, and a plurality of fixing components. The first plate includes a plurality of sub-plate areas, a plurality of crease areas and at least a flexible area. The plurality of sub-plate areas and the plurality of crease areas are alternately disposed on the first plate. The second plate is connected to the flexible area of the first plate. The input device is disposed on the second plate. The connecting base is disposed on the flexible area adjacent to the second plate. The plurality of fixing components is disposed on at least one of the first plate and the second plate. The first plate is folded along at least one of the crease area to make the cover in a first state, and the first plate turns over relative to the second plate to make the cover in a second state.

In sum, different angles are formed via the sub-plate areas. A first state is kept by the fixing components. Then, the user can adjust a viewing angle of the electronic device freely to watch the electronic device and use the input device conveniently. When the electronic device is not being used, the cover is changed to a second state to protect the electronic device and the input device.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
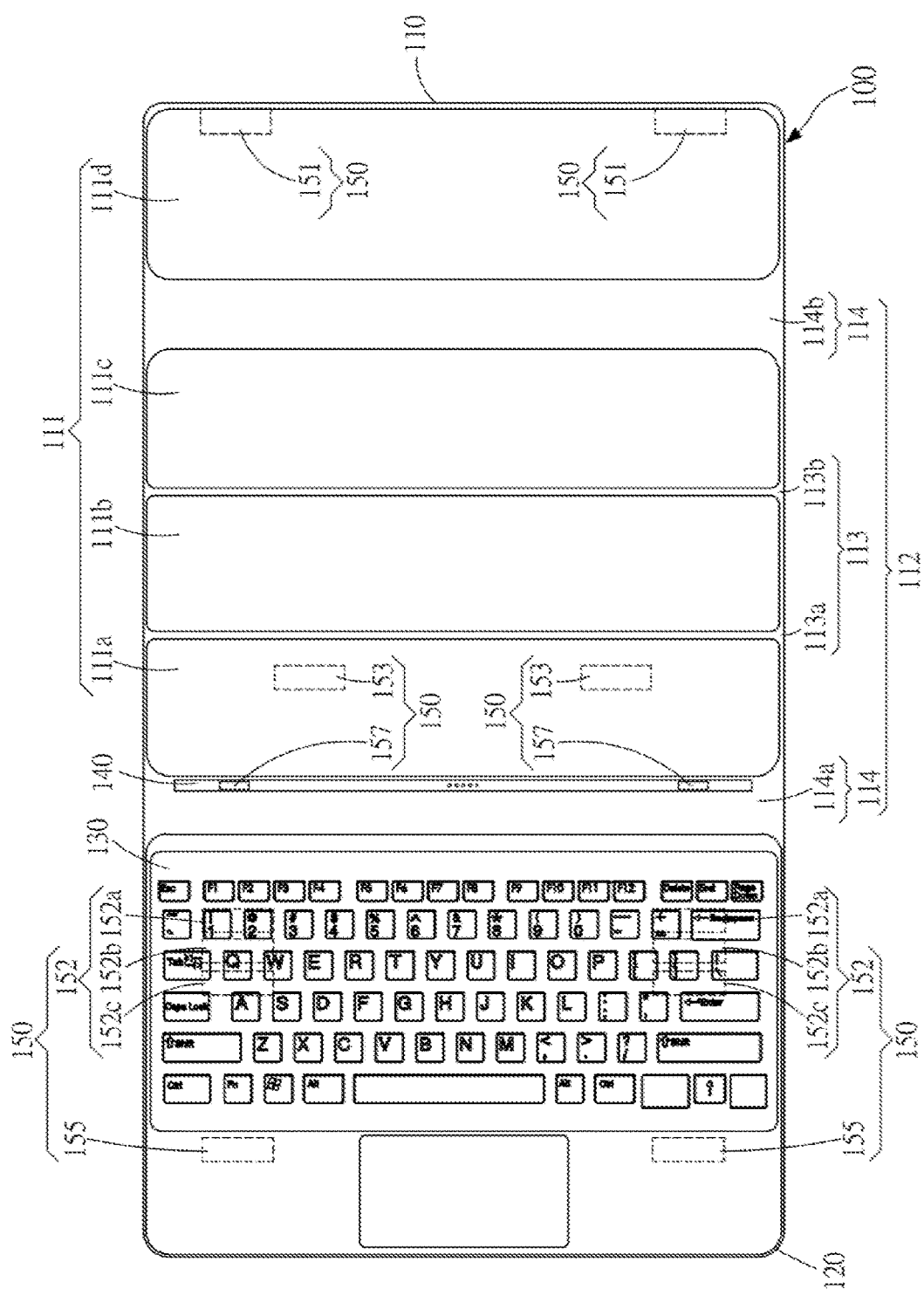
FIG. 1 is a top view showing a cover in an embodiment.
Figure 2:
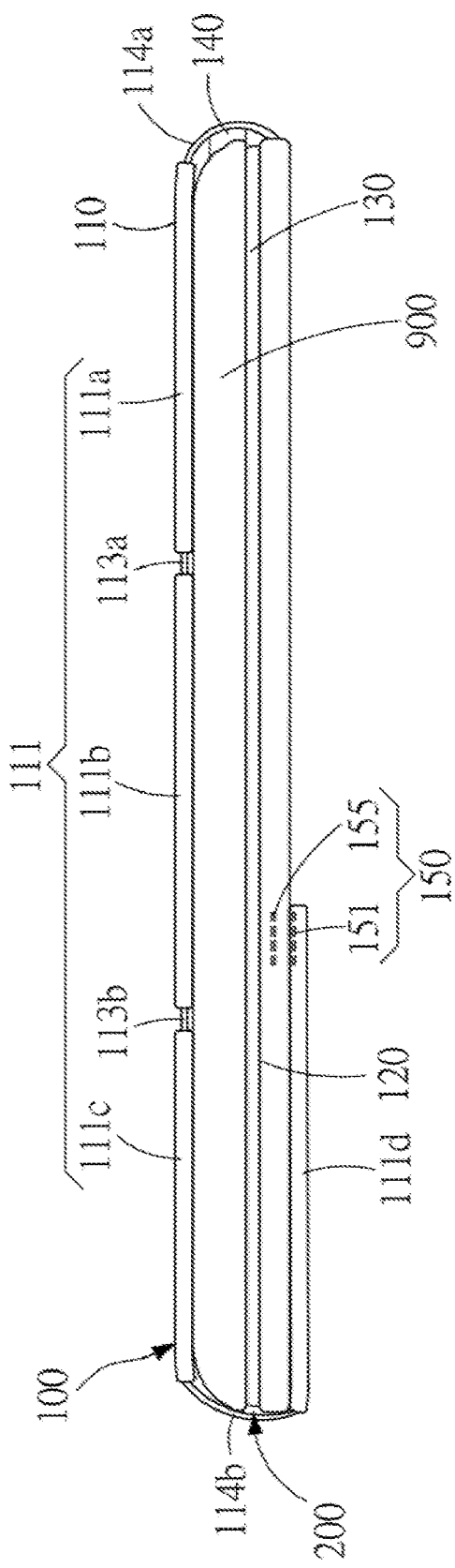
FIG. 2 is a schematic view showing a cover in a second state in an embodiment.
Figure 3:
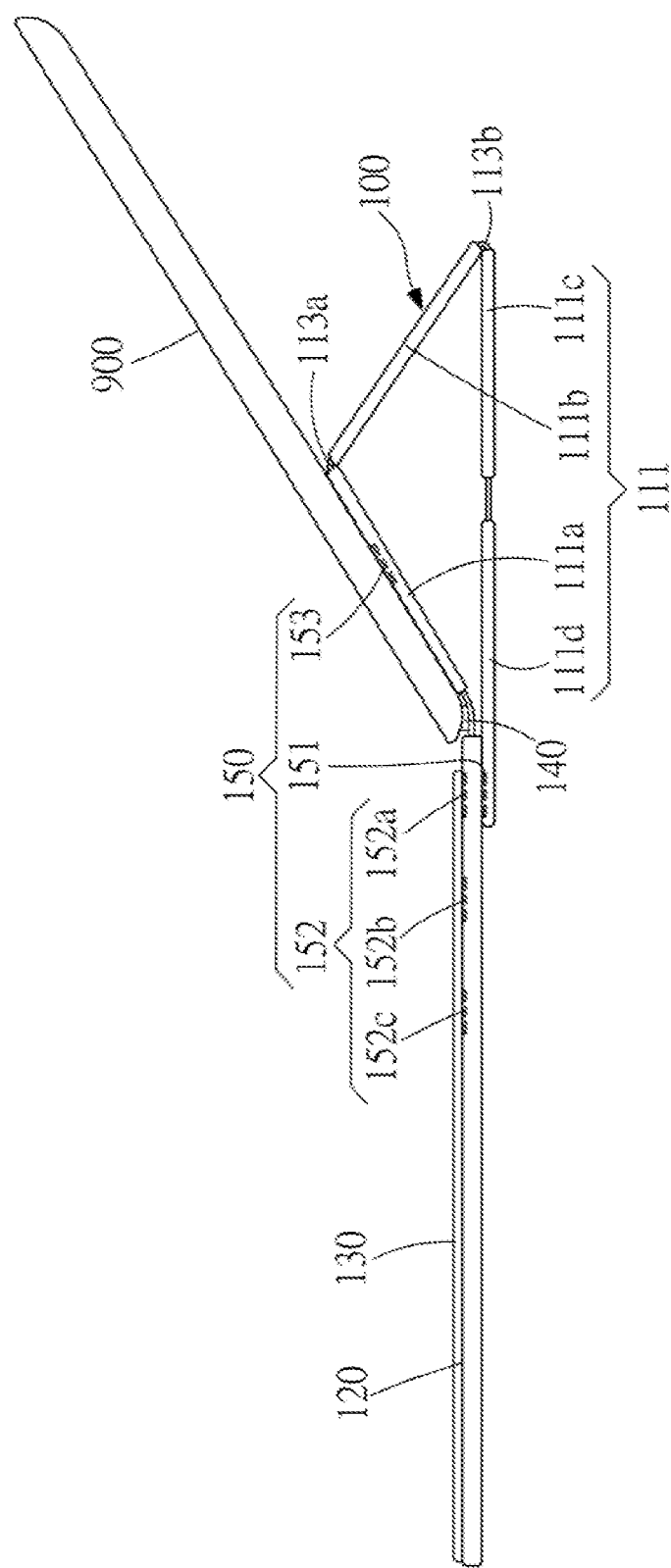
FIG. 3 is a schematic view showing a cover in a first state in an embodiment.

Please refer to FIG. 1 to FIG. 3. In an embodiment, a cover 100 is adapted to an electronic device 900. The cover 100 includes a first plate 110, a second plate 120, an input device 130, a connecting base 140 and a plurality of fixing components 150. The electronic device 900 is an electronic device 900 with a screen, such as a mobile phone or a tablet computer.

The first plate 110 includes a plurality of sub-plate areas 111, crease areas 113 and flexible areas 114. The sub-plate areas 111 and crease areas 113 are alternately disposed and parallel to each other. In an embodiment, the flexible area 114 is larger than the crease area 113. The first plate 110 is foldable. When the first plate 110 folds along at least one crease area 113, the folded cover is keeping in a state via the fixing components 150 to form a first state, such as a stand state shown in FIG. 3, to support the electronic device 900. In an embodiment, the sub-plate areas 111 include a sub-plate area 111a, a sub-plate area 111b, a sub-plate area 111c, and a sub-plate area 111d in sequence. The flexible areas 114 include a flexible area 114a adjacent to the sub-plate area 111a and a flexible area 114b adjacent to the sub-plate area 111c and the sub-plate area 111d. The crease areas 113 include a crease area 113a located between the sub-plate area 111a and the sub-plate area 111b and a crease area 113b located between the sub-plate area 111b and the sub-plate area 111c.

As shown in FIG. 2, the second plate 120 is adjacent to the flexible area 114a of the first plate 110. Then, when the first plate 110 turns over relative to the second plate 120 and faces to the second plate 120, an accommodating space 200 is formed between the first plate 110 and the second plate 120. That is, a second state is formed, also called a covering state, to accommodate the electronic device 900.

Please refer to FIG. 1 and FIG. 2, the input device 130 is disposed on the second plate 120. The input device 130 is a keyboard, a touch pad, a drawing board, a touch screen or other devices for input operations. In the embodiment, the input device 130 is a keyboard and a touchpad.

Please refer to FIG. 1 to FIG. 3. The connecting base 140 is disposed on the flexible area 114a adjacent to the second plate 120. The input device 130 is electrically connected to the connecting base 140. The input device 130 is electrically connected to a connecting port of the electronic device 900 via the connecting base 140. In the embodiment, the position and the shape of pins of the connecting port match with those of the connecting base 140. In an embodiment, the pin is a pogo pin. Moreover, the connecting base 140 is configured to transmit power or data signal between the input device 130 and the electronic device 900.

Figure 4:
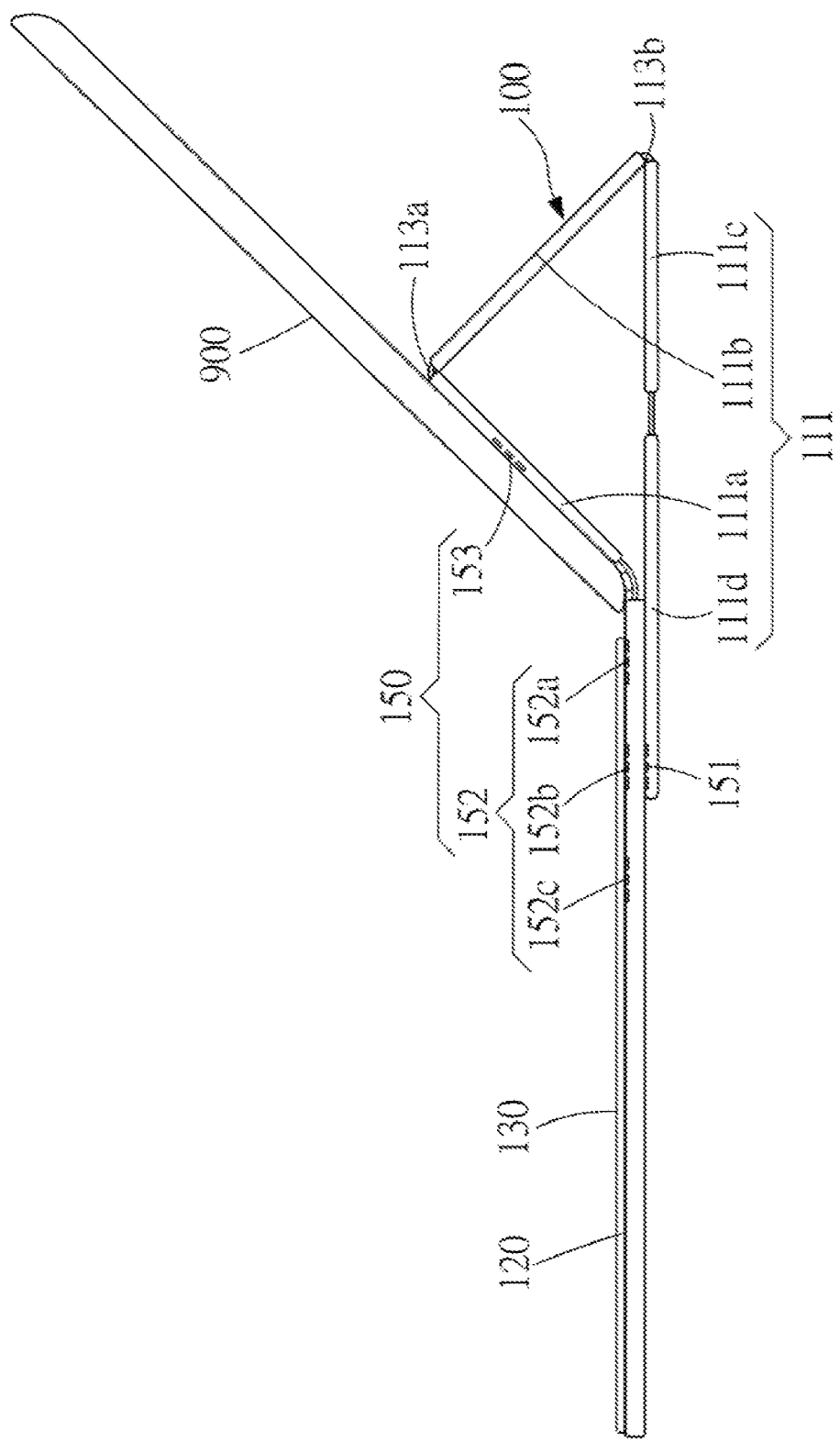
FIG. 4 is a schematic view showing a cover in other first state in an embodiment.

The fixing components 150 are disposed on at least one of the first plate 110 and the second plate 120. The fixing components 150 are used to fix a supporting angle of the cover 100 to support the electronic device 900. The fixing component 150 is a magnet, a trochal disc or a fabric hook. Please refer to FIG. 1 and FIG. 3. The fixing components 150 include a plurality of first fixing components 151 disposed on the sub-plate area 111d far away from the second plate 120 and a plurality of second fixing components 152 disposed on the second plate 120. In an embodiment, the first fixing components 151 are disposed adjacent a side of the first plate 110 far away from the second plate 120 (that is, a side of the sub-plate area 111d far away from the second plate 120). The second fixing components 152 are disposed on an area of the second plate 120 adjacent to the first plate 110. The second fixing components 152 are arranged in parallel in at least one row along a direction perpendicular to a major axis of the crease area 113. The number and position of the rows correspond to those of the first fixing components 151, respectively. In an embodiment, the second fixing components 152 are arranged in two rows. In another embodiment, the second fixing components 152 are arranged in one row along a direction perpendicular to the major axis of the crease area 113, and one first fixing component 151 is required to be fixed to one of the second fixing components 152. As shown in FIG. 3, when the cover 100 is in a first state, the sub-plate area 111d with the first fixing components 151 is disposed below the second plate 120, and the second fixing components 152 are selectively fixed to the first fixing components 151. As shown in FIG. 3, the first fixing components 151 are fixed to the second fixing component 152a in a first order. Please refer to FIG. 4, the first fixing components 151 are fixed to the second fixing component 152b in a second order. Please refer to FIG. 5, the first fixing components 151 are fixed to the second fixing component 152c in a third order. Please refer to FIG. 3 to FIG. 5, a supporting angle θ (an angle between the electronic device 900 and the sub-plate area 111d of the first plate 110, that is, an angle between the electronic device 900 and a surface of the second plate 120) of the first state is adjusted according to which fixing components 152 selected to fix to the first fixing component 151.

Figure 5:
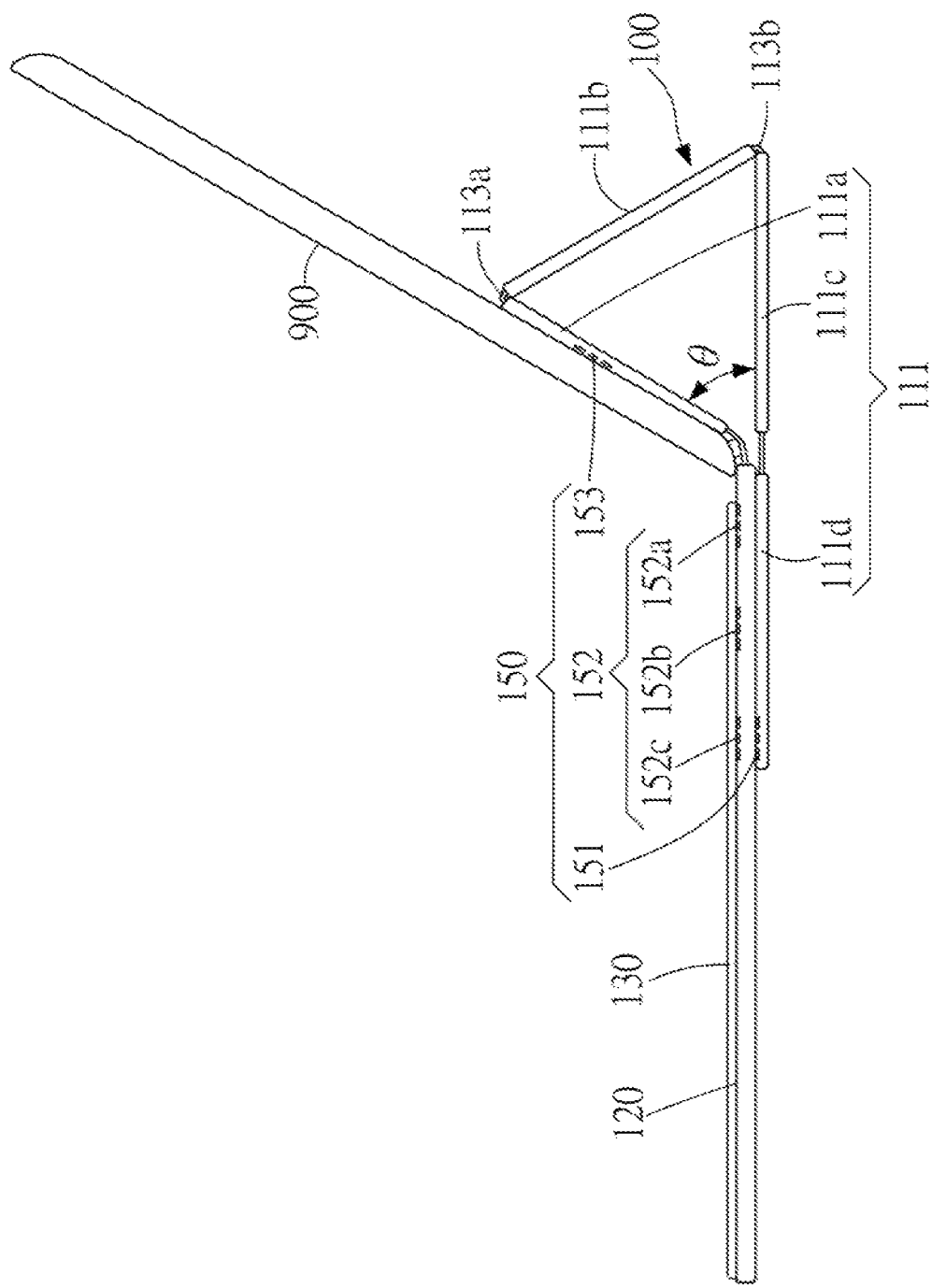
FIG. 5 is a schematic view showing a cover in another first state in an embodiment.

In an embodiment, a width of the crease area 113a and crease area 113b is between 0.1 millimeter and 1 millimeter. Then, the sub-plate areas 111 disposed adjacent both sides of the crease area 113 can abut against each other to support the electronic device 900. As shown in FIG. 5, the sub-plate area 111a and the sub-plate area 111b disposed adjacent both sides of the crease area 113 abut against each other to support the electronic device 900. In an embodiment, as shown in FIG. 3, in the first state, the first fixing component 151 and the second fixing component 152 in the first order are fixed to each other. The sub-plate area 111b and the sub-plate area 111c disposed adjacent both sides of the crease area 113 abut against each other to support the electronic device 900.

As shown in FIG. 3, the fixing components 150 further include at least one third fixing component 153. In an embodiment, the number of the third fixing components 153 is two. The third fixing components 153 are disposed on the sub-plate area 111a adjacent to the second plate 120. Thus, the third fixing component 153 is fixed to the electronic device 900 when the electronic device 900 is connected to the connecting base 140. Then, the electronic device 900 is leaned on the cover 100 steadily and supported by the cover 100, which avoids the collapse of the input device 130 when the electronic device 900 or the cover 100 is accidentally touched or moved.

Please refer to FIG. 1 and FIG. 2. The fixing component 150 further includes at least a fifth fixing component 155. In an embodiment, the number of the fifth fixing components 155 is two. The fifth fixing components 155 are disposed on the second plate 120. In a second state, the first plate 110 and the second plate 120 are fixed to each other via the first fixing component 151 and the fifth fixing component 155.

As shown in FIG. 1, the fixing component 150 further includes a plurality of seventh fixing components 157 disposed on the connecting base 140. In an embodiment, the number of the seventh fixing components 157 is two. The two seventh fixing components 157 are disposed at two sides of the connecting base 140, respectively, to align the electronic device 900 with the connecting base 140. Then, the connecting base 140 and the electronic device 900 are fixed to each other.

Figure 6:
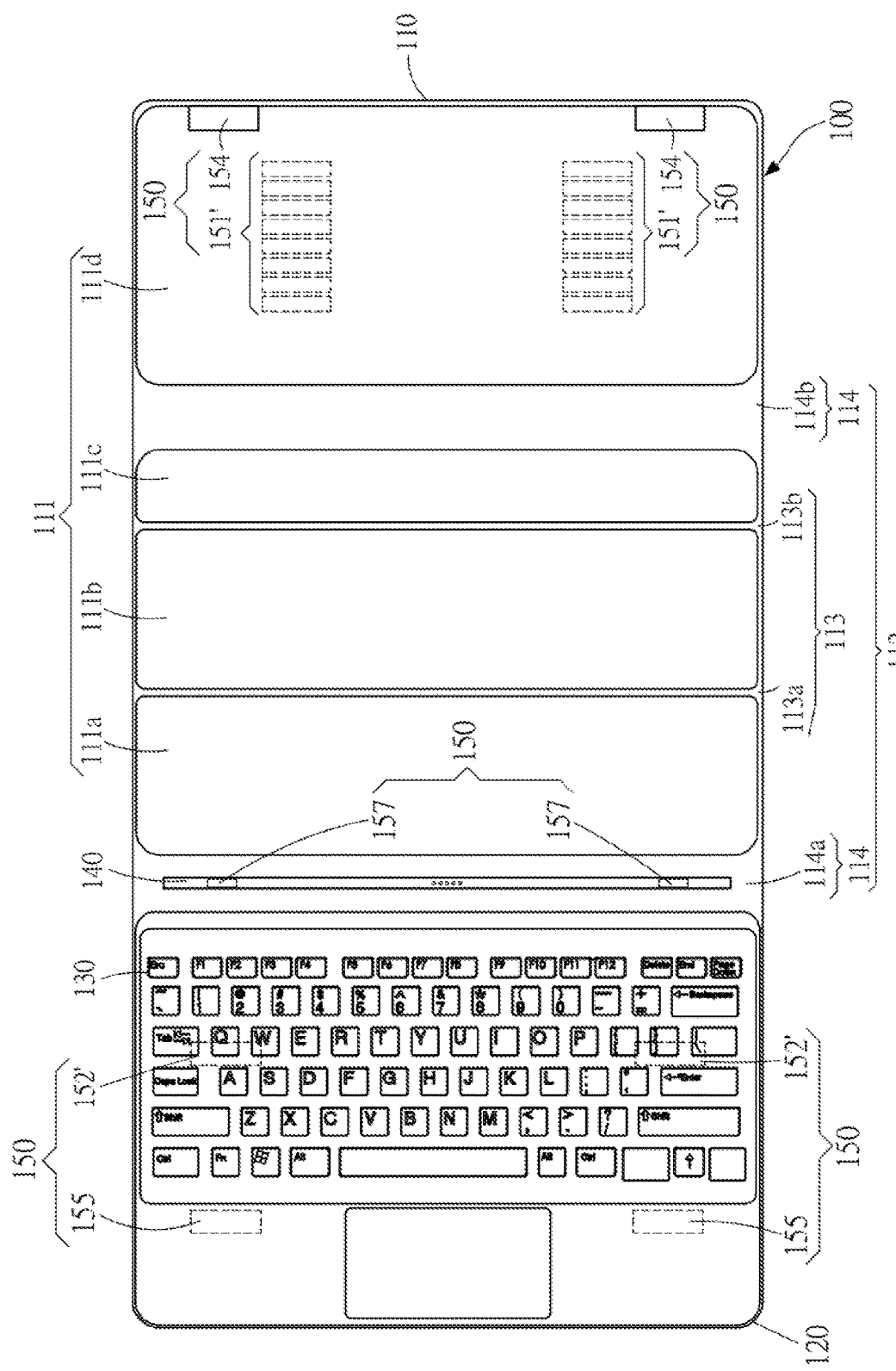
FIG. 6 is a top view showing a cover in an embodiment.
Figure 7:
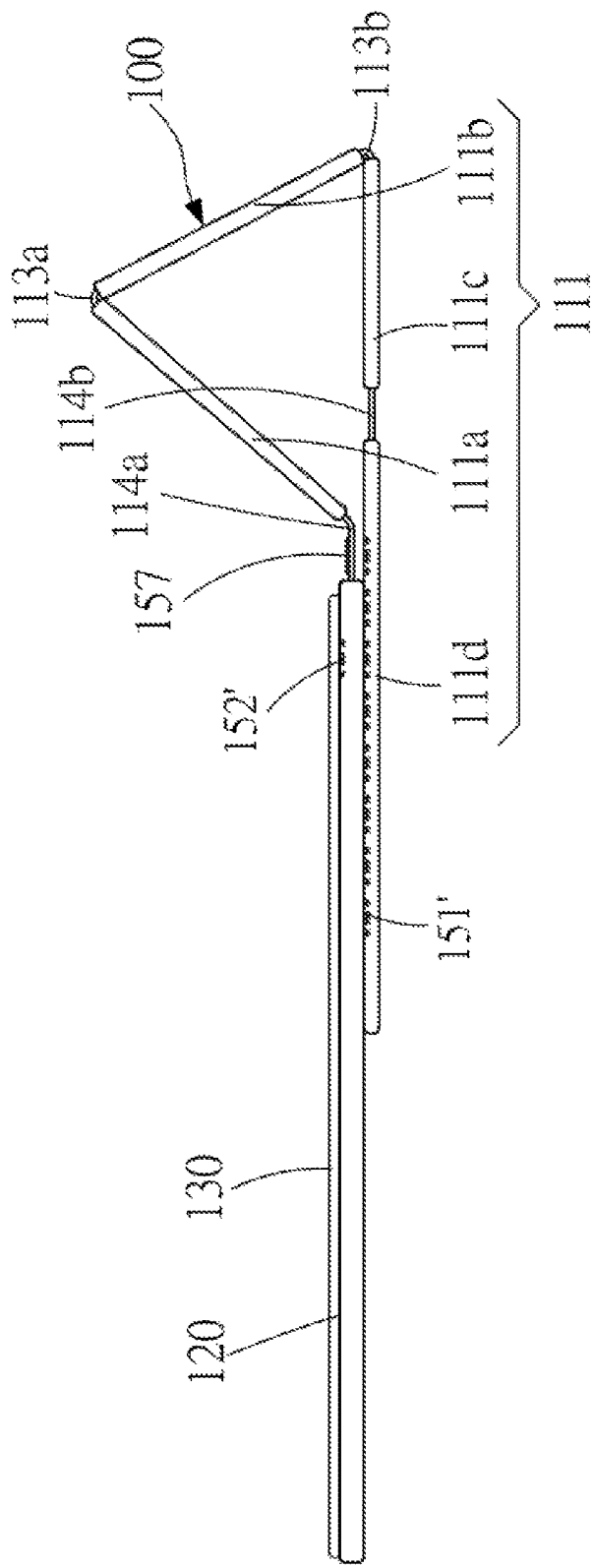
FIG. 7 is a schematic view showing a cover in a first state in an embodiment.
Figure 8:
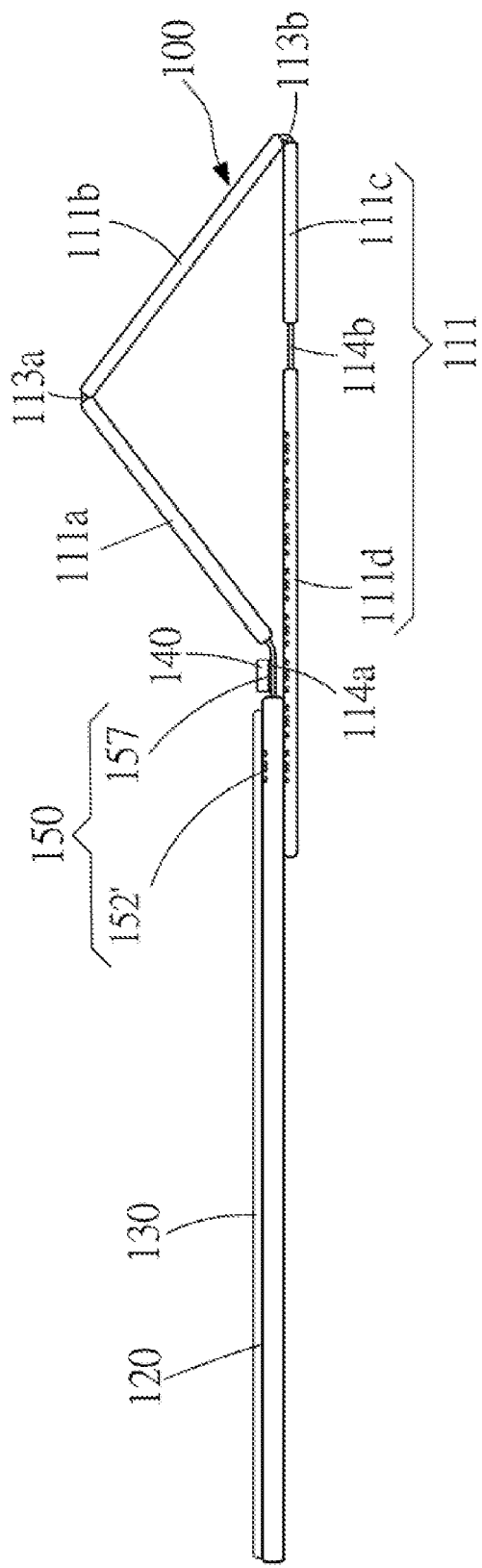
FIG. 8 is a schematic view showing a cover in other first state in an embodiment.

Please refer to FIG. 6 to FIG. 8. In the embodiment, the first fixing components 151' are disposed on the sub-plate area 111d that far away from the second plate 120. The first fixing components 151' are arranged in at least one row along a direction parallel to a minor axis of the flexible area 114a. In an embodiment, two rows of the first fixing components 151' are taken as an example. The number and the position of the first fixing components 151' depends on the second fixing component 152' that disposed on the second plate 120. As shown in FIG. 7 and FIG. 8, in the first state, the sub-plate area 111d with the first fixing components 151' is disposed below the second plate 120. The corresponding first fixing components 151' are selectively fixed to the second fixing components 152' to adjust the supporting angle of the first state.

In an embodiment, the fixing component 150 further includes a plurality of seventh fixing components 157 disposed on the connecting base 140. In the first state, the seventh fixing components 157 are fixed to the first fixing components 151'.

Figure 9:
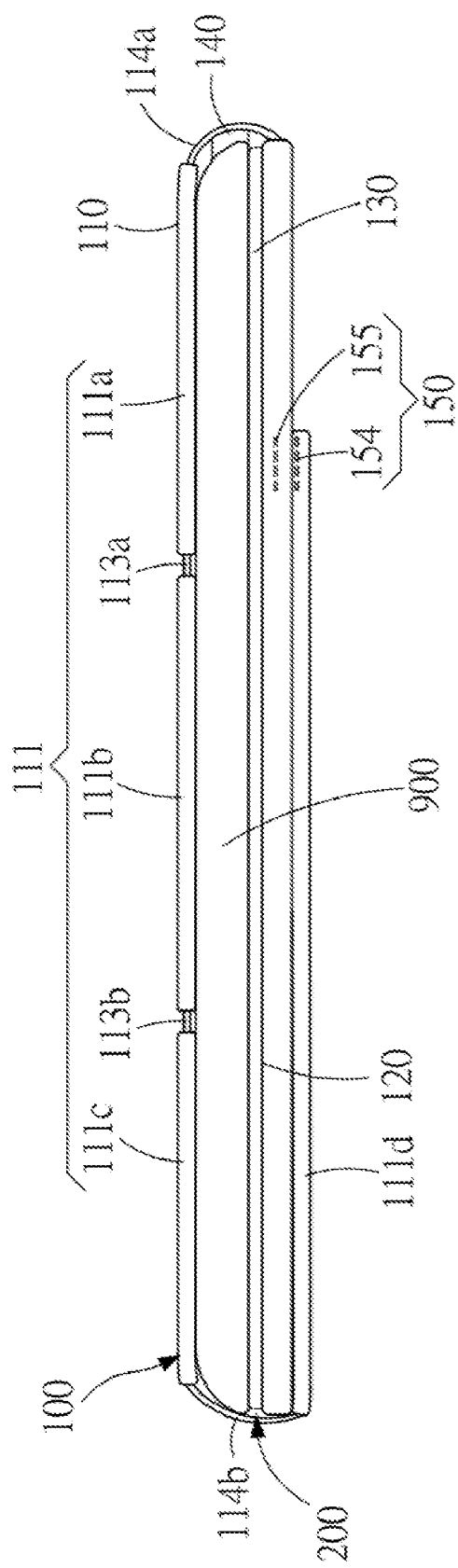
FIG. 9 is a schematic view showing a cover in a second state in an embodiment.

As shown in FIG. 6, the fixing component 150 further includes at least one fourth fixing component 154 and at least one fifth fixing component 155. In an embodiment, two fourth fixing components 154 and two fifth fixing components 155 are taken as an example. The fourth fixing components 154 are disposed on the sub-plate area 111d that far away from the second plate 120. In the embodiment, the fourth fixing components 154 are adjacent to the first plate 110 (that is, a side of the sub-plate area 111d that far away from the second plate 120). As shown in FIG. 9, the fifth fixing components 155 are disposed on the second plate 120.

Then, the first plate 110 and the second plate 120 are fixed to each other via the fourth fixing components 154 and the fifth fixing components 155 in the second state.

Figure 10:
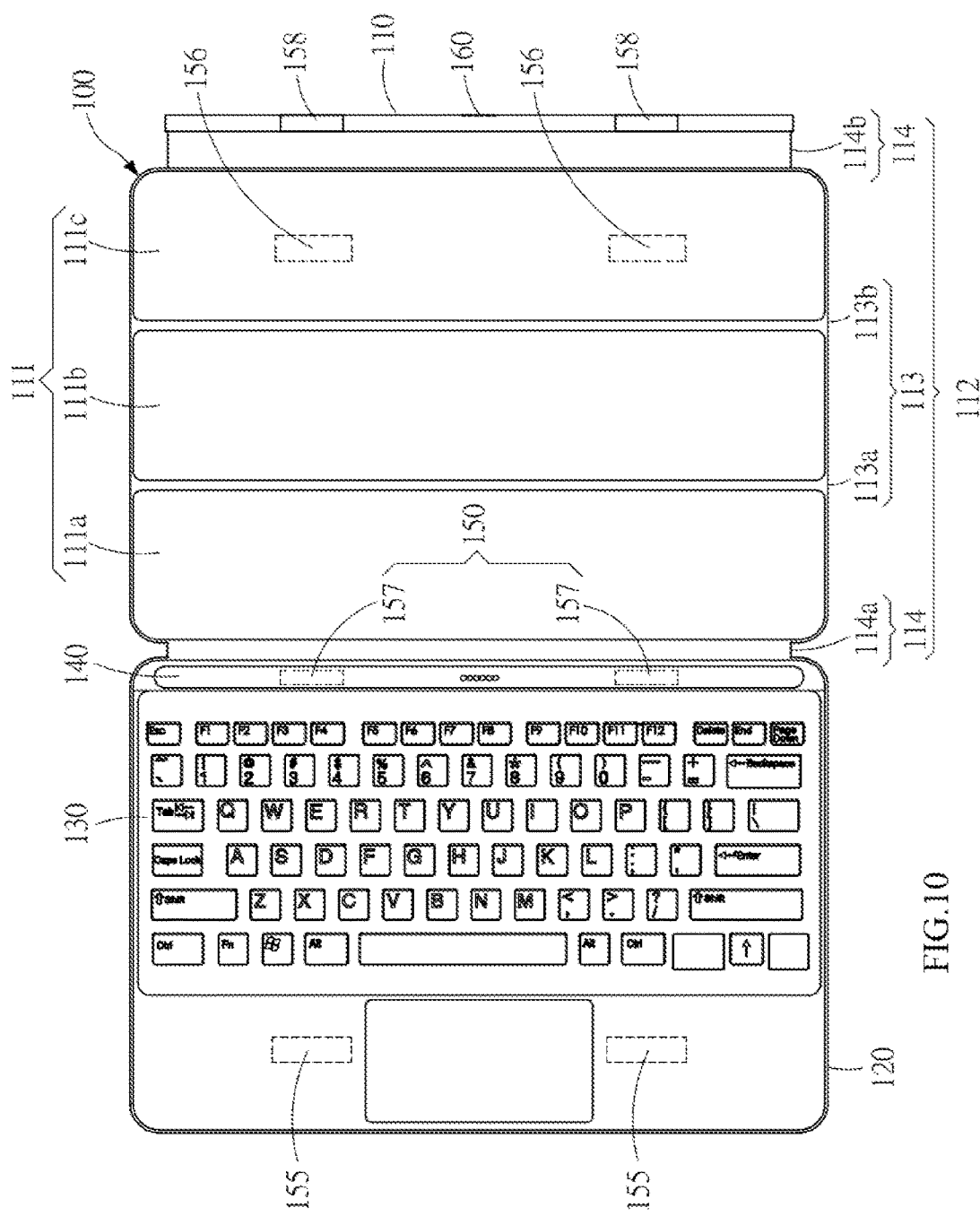
FIG. 10 is a top view showing a cover in an embodiment.
Figure 11:
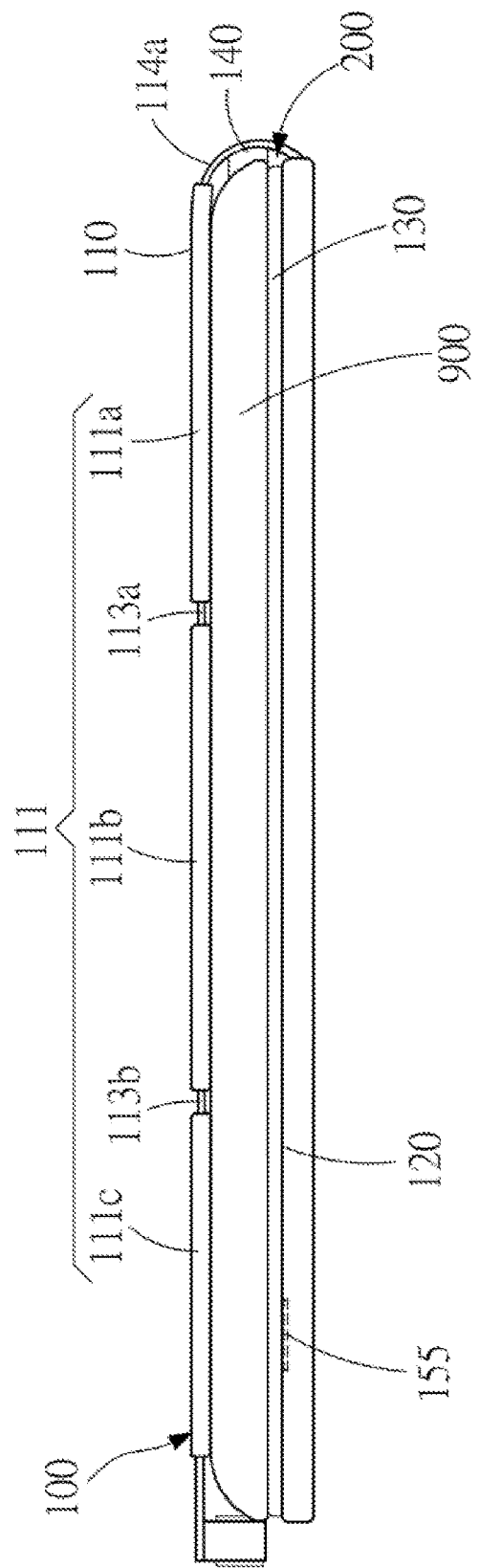
FIG. 11 is a schematic view showing a cover in a second state in an embodiment.
Figure 12:
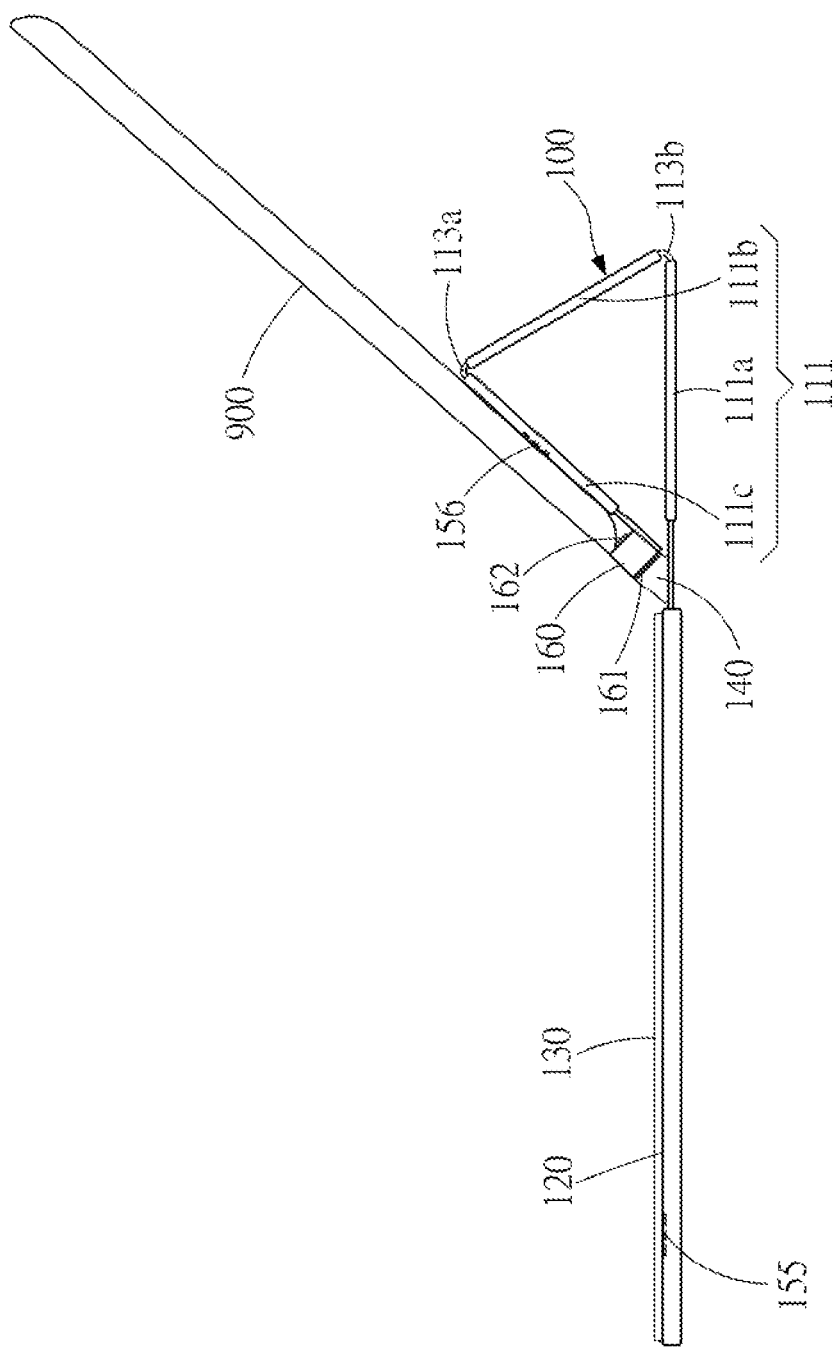
FIG. 12 is a schematic view showing a cover in a first state in an embodiment.

Please refer to FIG. 10 to FIG. 12. In an embodiment, the cover 100 includes the first plate 110, the second plate 120, the input device 130, the connecting base 140 and a plurality of the fixing components 150, which are similar above and are omitted herein. The difference is illustrated hereinafter.

In the embodiment, the sub-plate area 111 includes the sub-plate area 111a, the sub-plate area 111b and the sub-plate area 111c, but not includes the sub-plate area 111d. The flexible area 114 includes the flexible area 114a connected to the sub-plate area 111a and the flexible area 114b connected to the sub-plate area 111c. In an embodiment, the crease area 113 includes the crease area 113a located between the sub-plate area 111a and the sub-plate area 111b and the crease area 113b located between the sub-plate area 111b and the sub-plate area 111c. In the embodiment, the cover 100 further includes an adapter 160. The adapter 160 includes a first joint 161 and a second joint 162. The adapter 160 is disposed on a side of the first plate 110 far away from the second plate 120, that is, a side of the flexible area 114b far away from the second plate 120. When the sub-plate area 111 is folded toward the second plate 120 to make the cover 100 in the first state (as show in FIG. 12), the first joint 161 is connected to the connecting base 140. The second joint 162 is allowed to be connected to the electronic device 900. In the embodiment, the position and the shape of pins of the connecting port match with those of the connecting base 140 and the adapter 160. In an embodiment, the pin is a pogo pin. The connecting base 140 and the adapter 160 are configured to transmit power or data signal between the input device 130 and the electronic device 900. In the embodiment, the connecting base 140 is connected with the adapter 160 without a physical electric wire, which avoids the damage of the physical electric wires due to the bending of the cover.

Please refer to FIG. 10 to FIG. 12, the fixing components 150 include at least one of the sixth fixing components 156. In an embodiment, the number of the sixth fixing components 156 is two. The sixth fixing components 156 are disposed on the sub-plate area 111c adjacent to the adapter 160. In an embodiment, the electronic device 900 includes another fixing components corresponding to the sixth fixing components 156. When the sub-plate area 111 is folded toward the second plate 120 to make the cover 100 in the first state, the sixth fixing components 156 and the electronic device 900 are fixed to each other. As a result, the electronic device 900 is leaned on the cover 100 steadily and supported by the cover 100 to avoid the collapse of the input device 130 when the electronic device 900 is touched or the cover 100 is moved accidentally.

As shown in FIG. 10, a plurality of eighth fixing components 158 are disposed on the adapter 160. As shown in FIG. 12, in the first state, the eighth fixing components 158 are fixed with the corresponding seventh fixing components 157 located on the connecting base 140. Then, the adapter 160 is aligned and fixed with the connecting base 140 by the seventh fixing components 157 and the eighth fixing components 158. Moreover, the adapter 160 is aligned and fixed with the electronic by the eighth fixing components 158.

Figure 13:
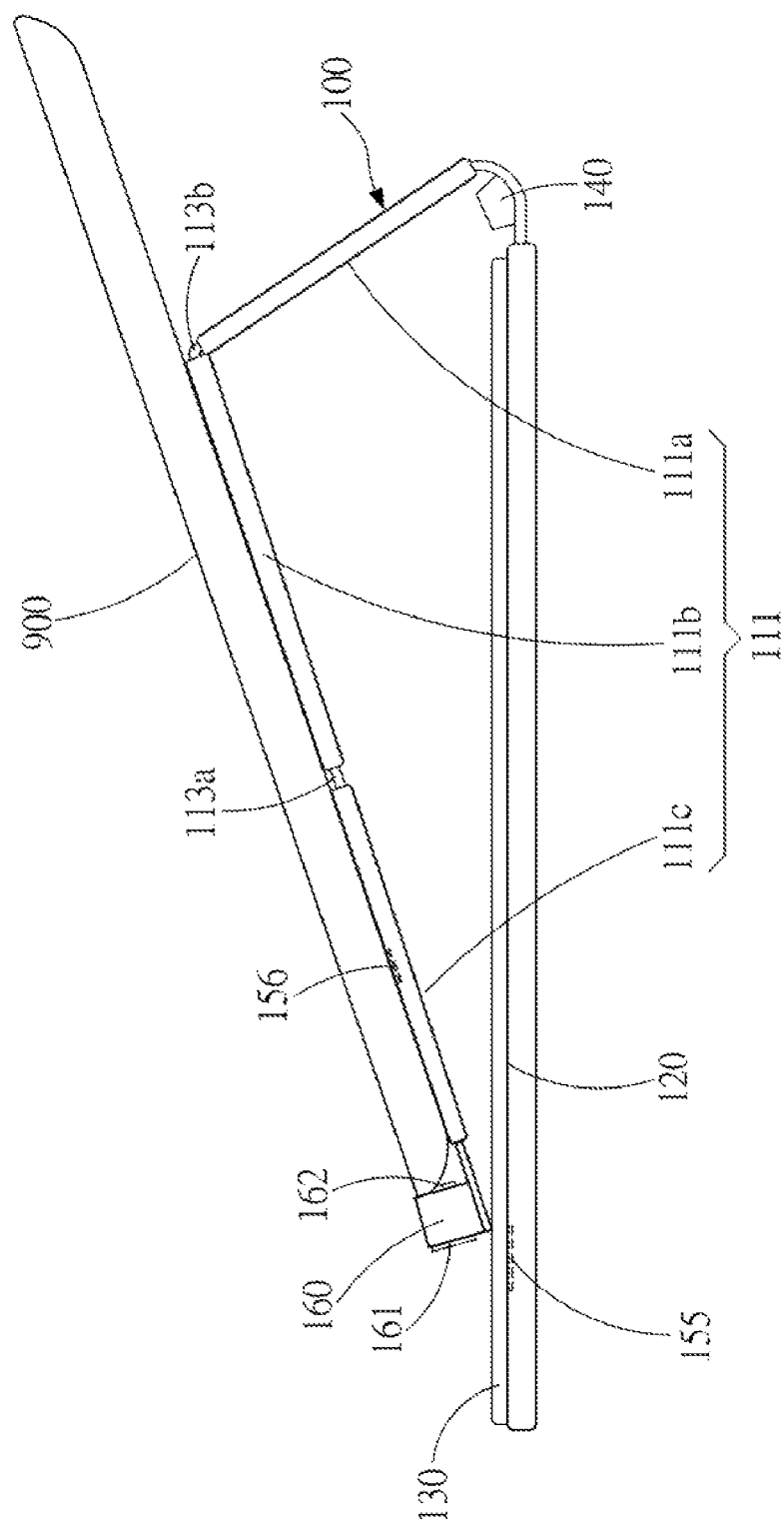
FIG. 13 is a schematic view showing a cover in another first state in an embodiment.

Please refer to FIG. 13, in an embodiment, the fixing component 150 further includes a plurality of fifth fixing components 155 disposed on the second plate 120. The fifth fixing components 155 are fixed with the adapter 160 connected to the electronic device 900 to support the electronic device 900 at a specific angle.

Figure 14:
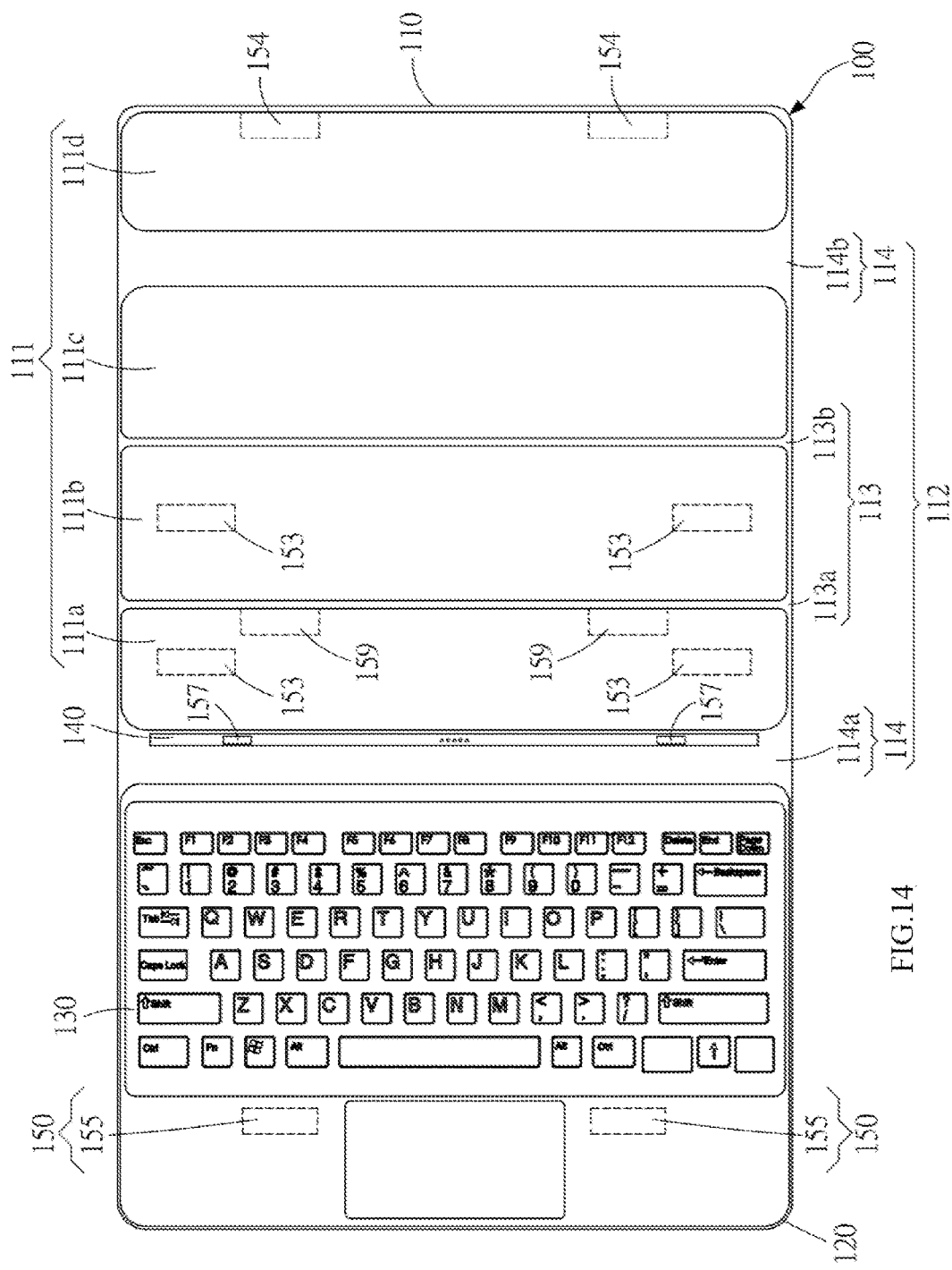
FIG. 14 is a top view showing a cover in an embodiment.
Figure 15:
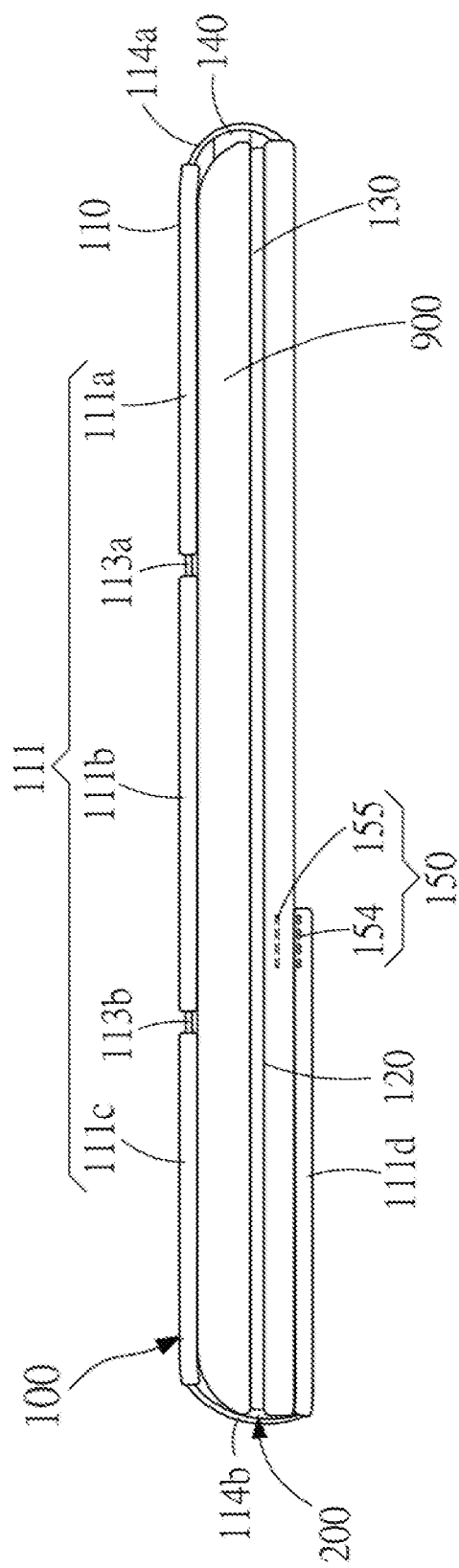
FIG. 15 is a schematic view showing a cover in a second state in an embodiment.
Figure 16:
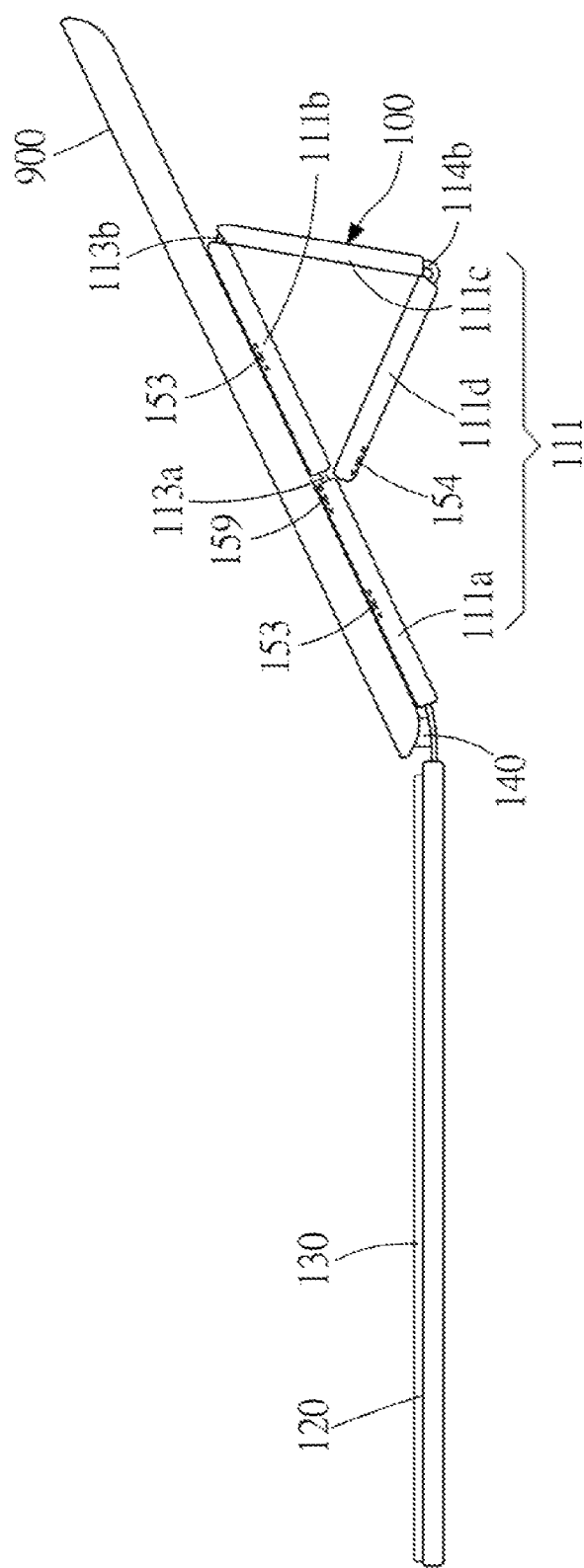
FIG. 16 is a schematic view showing a cover in a first state in an embodiment.

As shown in FIG. 14 to FIG. 16, in an embodiment, the cover 100 includes the first plate 110, the second plate 120, the input device 130, the connecting base 140 and a plurality of the fixing components 150, which are similar to that described above and are omitted herein. The difference is illustrated hereinafter.

Please refer to FIG. 14 and FIG. 16, the fixing component 150 includes at least one fourth fixing component 154 and at least one ninth fixing component 159. In an embodiment, two fourth fixing components 154 and two ninth fixing components 159 are taken as an example. The fourth fixing components 154 are disposed on a side of the first plate 110 far away from the second plate 120. In the embodiment, the fourth fixing components 154 are adjacent to the first plate 110 (that is, a side of the sub-plate area 111d that far away from the second plate 120). The ninth fixing components 159 are disposed on the crease area 113a of the first plate 110 that adjacent to the second plate 120. When the sub-plate area 111 is folded backward the second plate 120, the sub-plate area 111a and the sub-plate area 111b are contacted with the electronic device 900. Then, the first state is formed. At the first state, the fourth fixing components 154 and the ninth fixing components 159 are fixed to each other to make the first state kept. In the embodiment, the ninth fixing components 159 are disposed on the sub-plate area 111a.

As shown in FIG. 16, the fixing component 150 further includes at least one third fixing component 153. In an embodiment, two third fixing components 153 are taken as an example. The third fixing components 153 are disposed on the sub-plate area 111a adjacent to the second plate 120. Then, when the electronic device 900 is connected to the connecting base 140, the third fixing components 153 are fixed to the electronic device 900. As a result, the electronic device 900 is leaned on the cover 100 steadily and supported by the cover 100 to avoid the collapse of the input device 130 when the electronic device 900 is touched or the cover 100 is moved accidentally.

Figure 17:
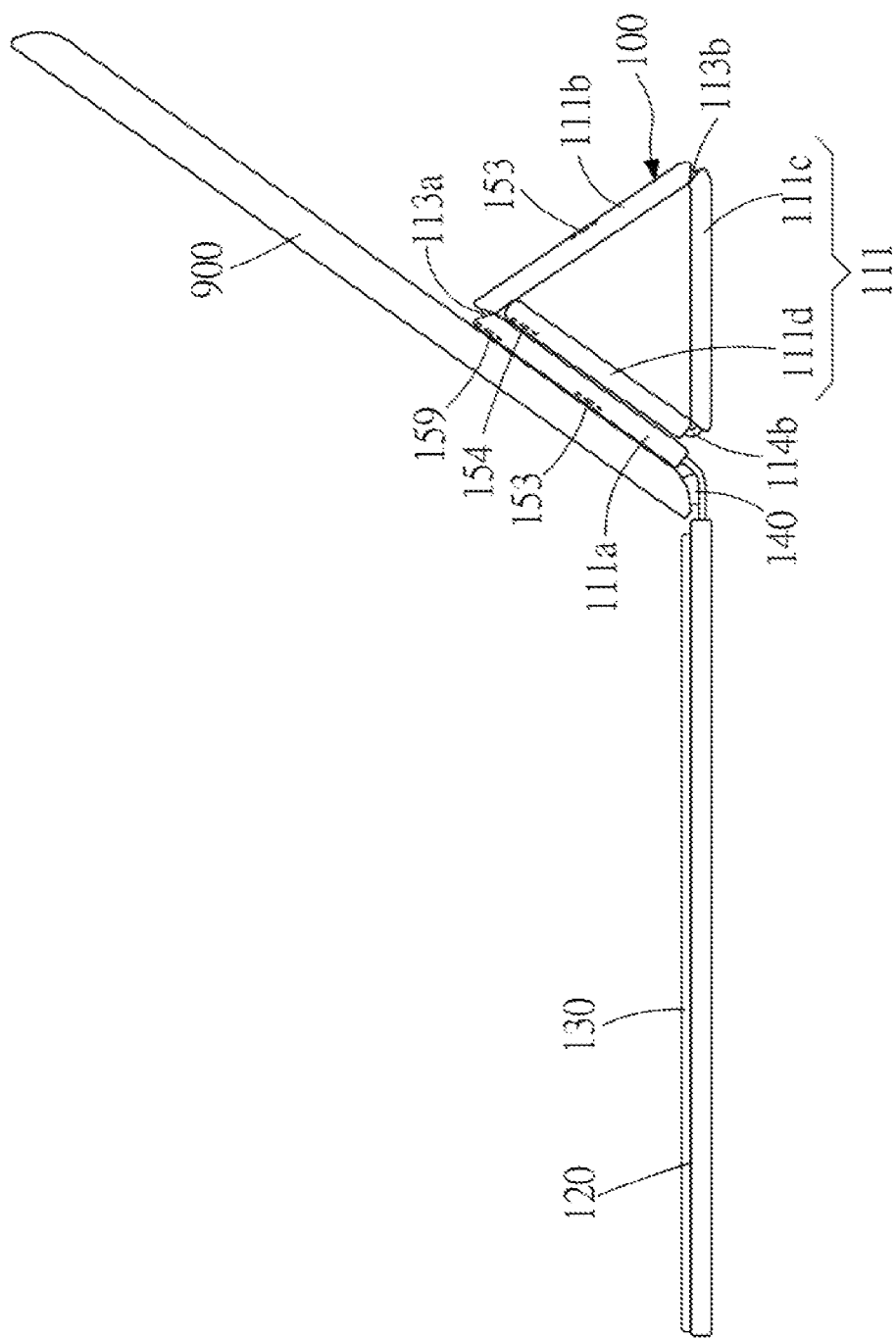
FIG. 17 is a schematic view showing a cover in another first state in an embodiment.
Figure 18:
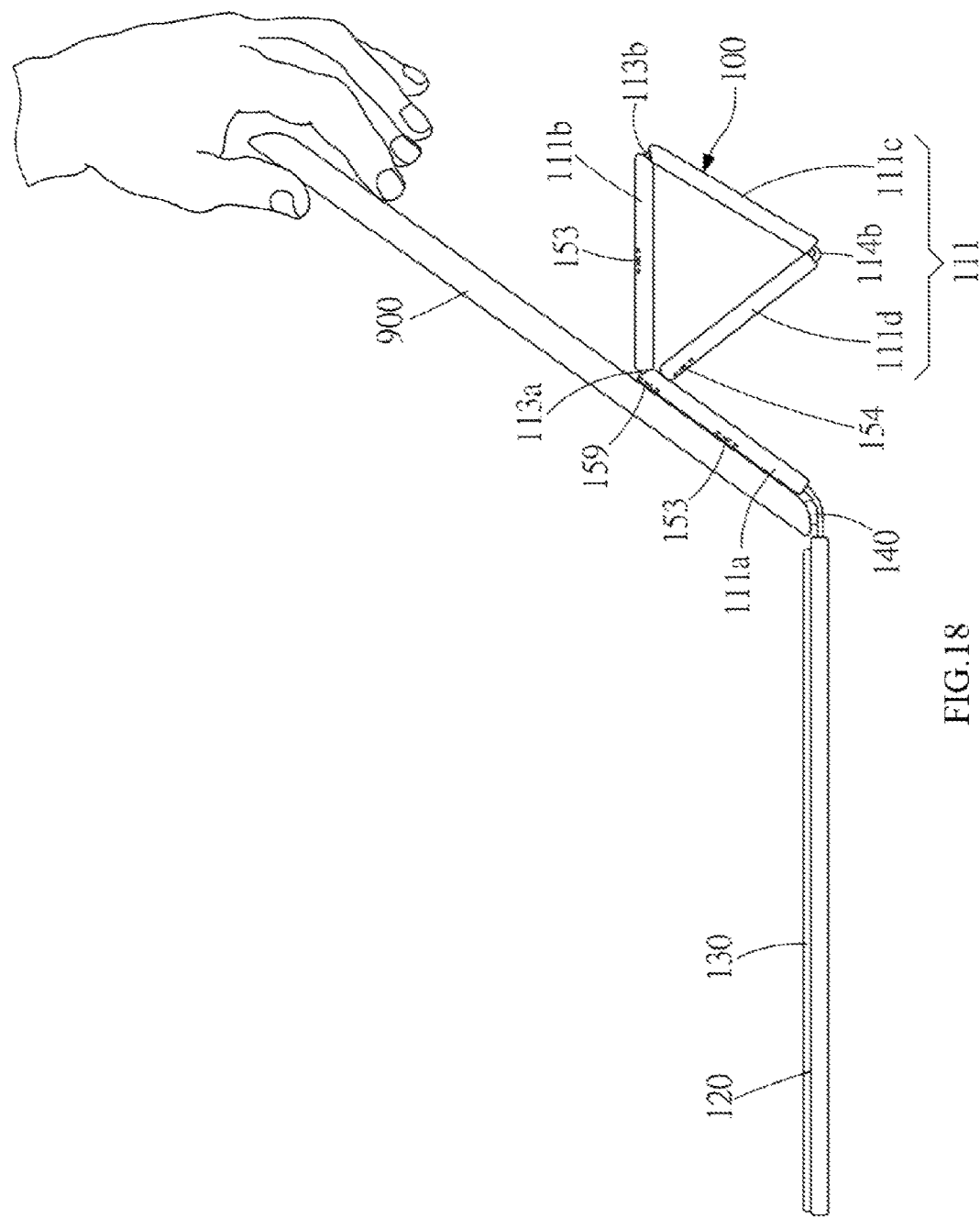
FIG. 18 is an operation diagram showing a cover in an embodiment.

As shown in FIG. 18, when the user lifts up the electronic device 900 located on the cover 100 in the first state as shown in FIG. 16, a triangular prism formed by the sub-plate area 111b, the sub-plate area 111c and the sub-plate area 111d is folded toward the sub-plate area 111a. Then, the cover 100 is in the first state shown in FIG. 17. Only the sub-plate area 111a is contacted with the electronic device 900 among the sub-plate areas 111. Since the ninth fixing component 159 is disposed on the sub-plate area 111a adjacent to the crease area 113a, the sub-plate area 111a is continued to be fixed to the fourth fixing component 154 to keep in the first state.

Figure 19:
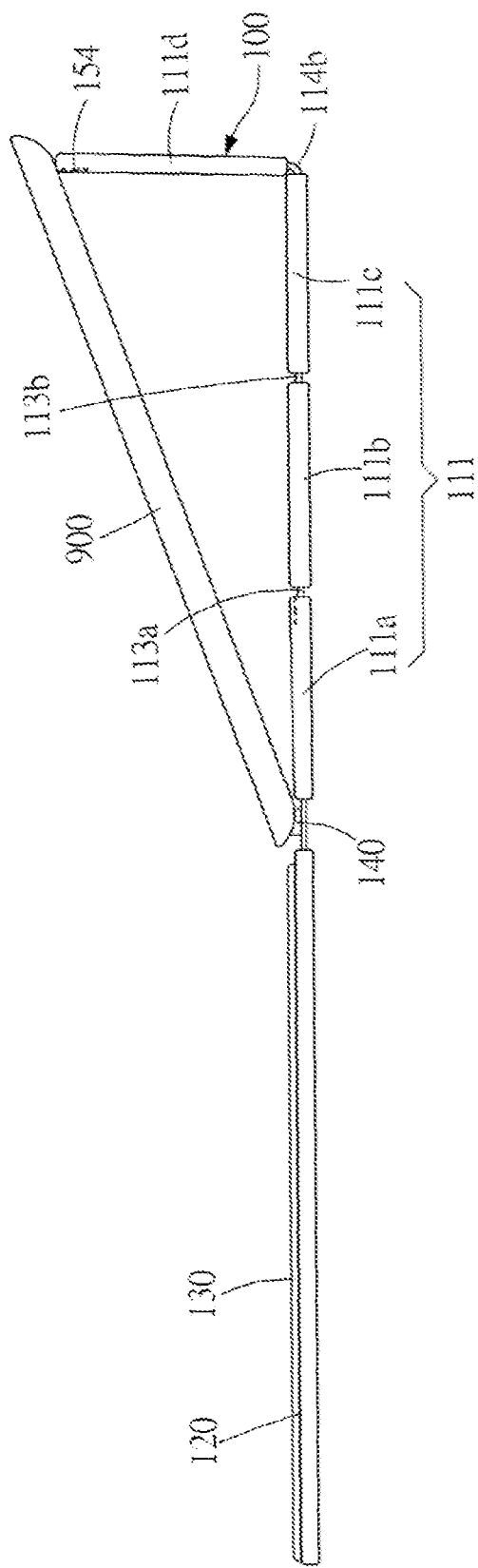
FIG. 19 is a schematic view showing a cover in another first state in an embodiment.

As shown in FIG. 19, after the electronic device 900 is connected to the connecting base 140, the sub-plate area 111d with the fourth fixing component 154 is uprightly standing to against the electronic device 900. The electronic device 900 is fixed via the fourth fixing component 154. As a result, the electronic device 900 is supported in a supporting angle.

Figure 20:
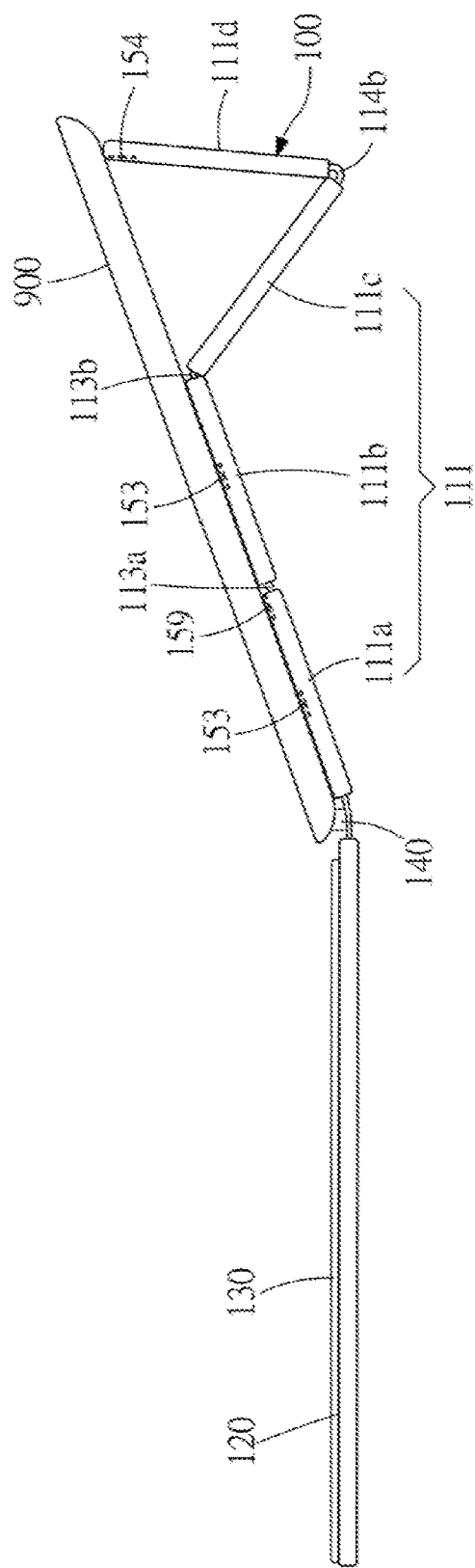
FIG. 20 is a schematic view showing a cover in another first state in an embodiment.

Compared to FIG. 19, as shown in FIG. 20, except for the third fixing components 153 disposed on the sub-plate area 111a adjacent to the second plate 120, the third fixing components 153 are further disposed on the sub-plate area 111b adjacent to the sub-plate area 111a. The third fixing components 153 are fixed to the electronic device 900. As a result, the sub-plate area 111b and the sub-plate area 111c abut against each other to provide different supporting angles.

Figure 21:
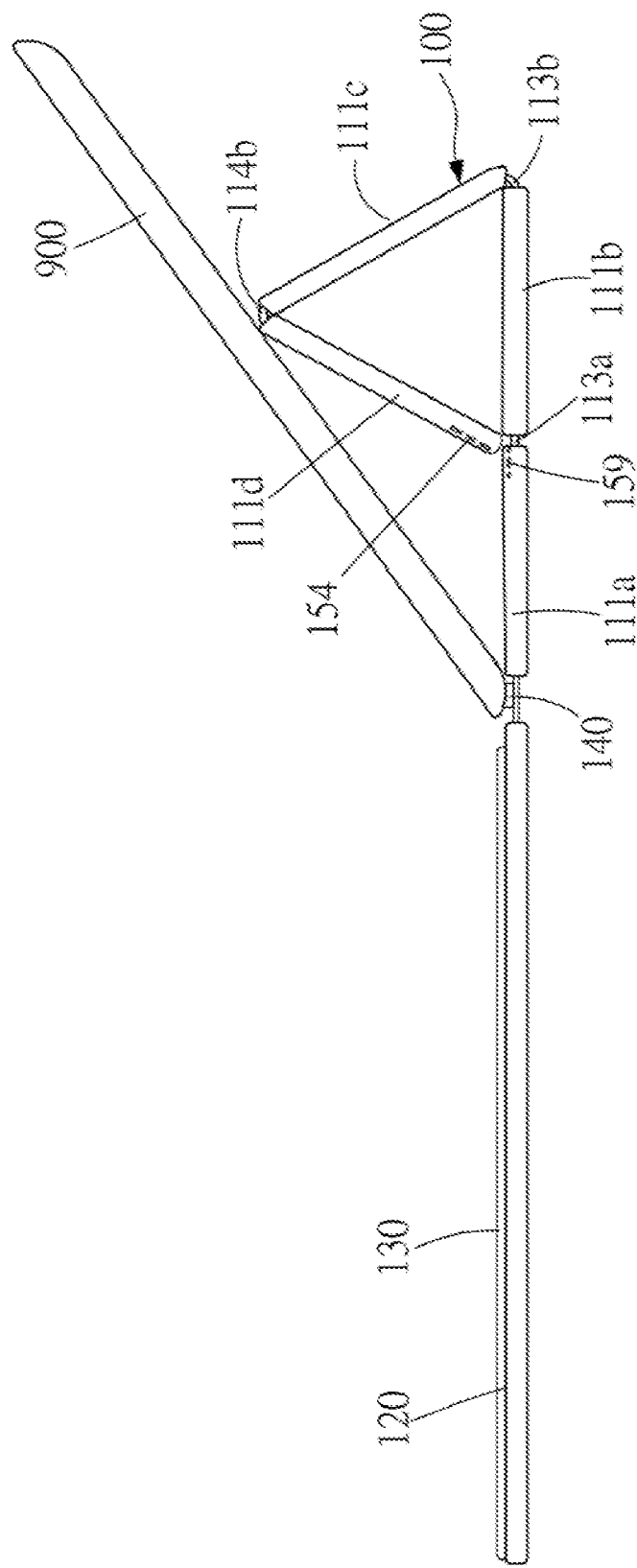
FIG. 21 is a schematic view showing a cover in another first state in an embodiment.

Compared to the state in FIG. 16, the first state shown in FIG. 21 is formed by folding the sub-plate area 111c and the sub-plate area 111d in a direction opposite to the folding direction shown in FIG. 16. The cover 100 contacts with the electronic device 900 via the flexible area 114b. The fourth fixing component 154 and the ninth fixing component 159 are fixed to each other to make the cover 100 keep in the first state.

Figure 22:
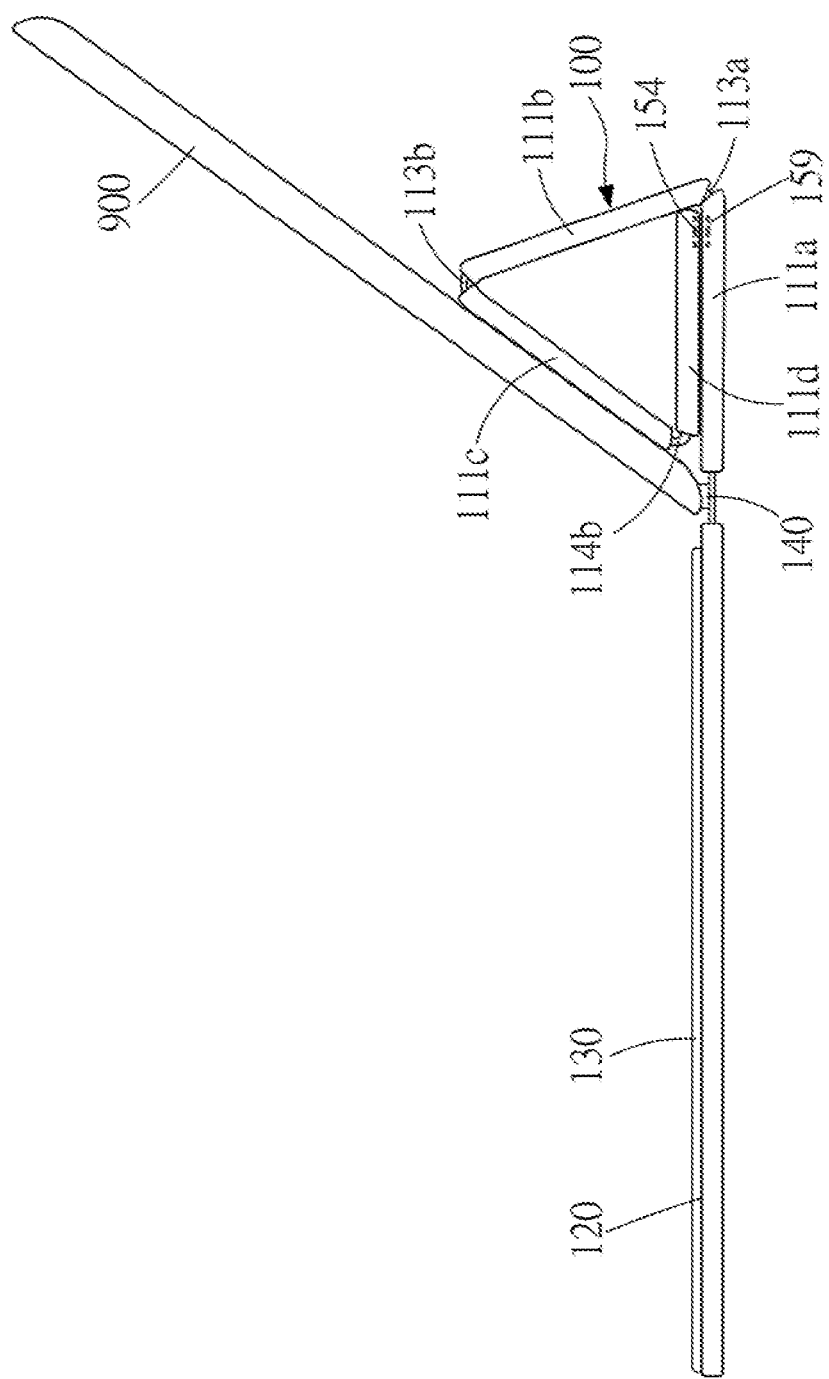
FIG. 22 is a schematic view showing a cover in another first state in an embodiment.

The first state shown in FIG. 22 is formed by continuing rotating the triangular prism formed by the sub-plate area 111b, the sub-plate area 111c and the sub-plate area 111d shown in FIG. 21. That is, the sub-plate area 111a is overlapped with the sub-plate area 111d.

In sum, different angles are formed between the sub-plate areas 111. The first state is kept via the fixing components 150. Then, a viewing angle of the electronic device 900 is adjusted freely to watch the electronic device 900 and use the input device 130 conveniently. When not being in used, the cover 100 is changed to the second state to protect the electronic device 900 and the input device 130.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A cover, adapted to an electronic device, the cover comprising:
   a first plate including a plurality of sub-plate areas, a plurality of crease areas and at least a flexible area, the plurality of sub-plate areas and the plurality of crease areas are alternately disposed on the first plate;
   a second plate connected to the flexible area of the first plate;
   an input device disposed on the second plate;
   a connecting base disposed on the flexible area adjacent to the second plate, and
   a plurality of fixing components disposed on at least one of the first plate and the second plate, wherein the plurality of fixing components includes at least one first fixing component disposed on the first plate and a plurality of seventh fixing components disposed on the connecting base, the connecting base and the electronic device are fixed to each other;
   wherein the first plate is folded along at least one of the crease area to make the cover in a first state, in the first state, the seventh fixing components are fixed to the first fixing components, and wherein the first plate turns over relative to the second plate to make the cover in a second state.

2. The cover according to claim 1, wherein the fixing components further include a plurality of second fixing components disposed on the second plate, the second fixing components are arranged in at least one row along a direction perpendicular to a major axis of the crease areas, and in the first state, at least one first fixing component is correspondingly fixed to one of the second fixing components.

3. The cover according to claim 2, wherein the fixing components further include at least one third fixing component disposed on the sub-plate areas adjacent to the second plate, and the third fixing component is fixed to the electronic device when the electronic device is connected to the connecting base.

4. The cover according to claim 2, wherein the fixing components further include at least one fifth fixing component disposed at the second plate, when the cover is in the second state, the first plate and the second plate are fixed to each other via the first fixing components and at least one fifth fixing component.

5. The cover according to claim 1, wherein the fixing components include a plurality of first fixing components disposed on the first plate and at least one second fixing component disposed on the second plate, the first fixing components are arranged in at least one row along a direction perpendicular to a major axis of the crease areas, and when the cover is in the first state, at least one second fixing component is correspondingly fixed to one of the first fixing components.

6. The cover according to claim 5, wherein the fixing components further include at least one third fixing component disposed on a plurality of the sub-plate areas adjacent to the second plate, the third fixing component is fixed to the electronic device when the electronic device is connected to the connecting base.

7. The cover according to claim 5, wherein the fixing components further include at least one fourth fixing component disposed on a side of the first plate and at least one fifth fixing component disposed on the second plate, when the cover is in the second state, the first plate and the second plate are fixed to each other via the fourth fixing component and the fifth fixing component.

8. A cover, adapted to an electronic device, the cover comprising:
   a first plate including a plurality of sub-plate areas, a plurality of crease areas and at least a flexible area, the plurality of sub-plate areas and the plurality of crease areas are alternately disposed on the first plate;
   a second plate connected to the flexible area of the first plate;
   an input device disposed on the second plate;
   a connecting base disposed on the flexible area adjacent to the second plate, and
   a plurality of fixing components disposed on at least one of the first plate and the second plate; and
   an adapter, the adapter includes a first joint and a second joint, the adapter is disposed on a side of the first plate far away from the second plate, wherein the first plate is folded along at least one of the crease area to make the cover in a first state, in the first state, the first joint is connected to the connecting base and the second joint is connected to the electronic device, and wherein the first plate turns over relative to the second plate to make the cover in a second state.

9. The cover according to claim 8, wherein the fixing components further include at least one sixth fixing component disposed on the sub-plate area adjacent to the adapter, the sixth fixing component is fixed to the electronic device when the sub-plate areas are folded toward the second plate to make the cover in the first state.

10. The cover according to claim 8, wherein the fixing components include a plurality of fifth fixing components disposed on the second plate, the fifth fixing components are fixed to the adapter to fix a supporting angle of the cover in the first state.

11. The cover according to claim 8, wherein the fixing components include a plurality of seventh fixing components disposed on the connecting base and a plurality of eighth fixing components disposed on the adapter, the adapter is aligned and fixed with the connecting base via the plurality of seventh fixing components and the plurality of eighth fixing components.

12. A cover, adapted to an electronic device, the cover comprising:

a first plate including a plurality of sub-plate areas, a plurality of crease areas and at least a flexible area, the plurality of sub-plate areas and the plurality of crease areas are alternately disposed on the first plate;

a second plate connected to the flexible area of the first plate;

an input device disposed on the second plate;

a connecting base disposed on the flexible area adjacent to the second plate, and a plurality of fixing components disposed on at least one of the first plate and the second plate; the plurality of fixing components includes at least one fourth fixing component and at least one ninth fixing component, the fourth fixing component is disposed on a side of the first plate far away from the second plate, the ninth fixing component is disposed on a side of the crease area on the first plate adjacent to the second plate, wherein the first plate is folded along at least one of the crease area to make the cover in a first state, the fourth fixing component and the ninth fixing component are fixed to each other to keep the cover in the first state when the sub-plate areas are folded toward the second plate, and wherein the first plate turns over relative to the second plate to make the cover in a second state.

13. The cover according to claim 12, wherein when the electronic device is connected to the connecting base, the sub-plate area with at least one fourth fixing component is uprightly standing to against the electronic device, and the electronic device is fixed via at least one fourth fixing component.

14. The cover according to claim 12, wherein the fixing components include at least one third fixing component disposed on the sub-plate areas, and the third fixing component is fixed to the electronic device when the electronic device is connected to the connecting base.

15. The cover according to claim 12, wherein the fixing components include at least one fourth fixing component and at least one fifth fixing component, the fourth fixing component is disposed on the sub-plate area far away from the second plate, the fifth fixing component is disposed on the second plate, the first plate and the second plate are fixed to each other via the fourth fixing component and the fifth fixing component when the cover is in the second state.

* * * * *